(12) United States Patent
Ayzenshtat

(10) Patent No.: US 9,026,684 B2
(45) Date of Patent: May 5, 2015

(54) SUPERVISION OF I2S DIGIITAL AUDIO BUS

(71) Applicant: Leonid Ayzenshtat, Wharton, NJ (US)

(72) Inventor: Leonid Ayzenshtat, Wharton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/041,267

(22) Filed: Sep. 30, 2013

(65) Prior Publication Data

US 2015/0092946 A1   Apr. 2, 2015

(51) Int. Cl.
*G06F 3/00* (2006.01)
*H04R 29/00* (2006.01)

(52) U.S. Cl.
CPC .................................. *H04R 29/001* (2013.01)

(58) Field of Classification Search
USPC ............................................................ 710/5
See application file for complete search history.

(56) References Cited

U.S. PATENT DOCUMENTS

| | | |
|---|---|---|
| 2005/0033586 A1 | 2/2005 | Savell |
| 2007/0124150 A1 | 5/2007 | Sinai |
| 2012/0207065 A1* | 8/2012 | Shida ............................ 370/279 |

OTHER PUBLICATIONS

PCT Search Report dated Jul. 1, 2014, for PCT Application No. PCT/EP2014/056234. (9 pages).

* cited by examiner

*Primary Examiner* — Chun-Kuan Lee

(57) ABSTRACT

An approach for supervision of I2S bus audio paths employing a signal derived from a word clock signal of the I2S bus.

18 Claims, 6 Drawing Sheets

SUPERVISION OF I2S DIGIITAL AUDIO BUS

FIELD OF THE INVENTION

This application relates to the field of semiconductor chip communication, and more particularly to integrated interchip sound (I2S) audio communication.

BACKGROUND

In alarm systems, such as building fire alarm systems, it is desirable to have audio capabilities. Audio capabilities enable emergency messages to be passed between fire control panels and/or audio panels in an alarm system. As public safety is impacted by building alarm systems, standards have been developed by organizations in the United States and Europe. Some standards, such as UL 864 $9^{th}$ Edition and 5527 $3^{rd}$ Edition require the audio paths to be monitored to assure their operational status. Methods have been developed and deployed in the past to monitor audio paths external to the fire control panels and audio control panels.

Current technology processes audio signals in the digital domain within and between semiconductor chips. But current standards require the monitoring of these portions of the audio bus. The known approaches fail to monitor inter-chip audio paths and buses between semiconductor chips. What is needed in the art is an approach that enables monitoring the audio paths internal and external to the semiconductor chips in an efficient way while reducing the amount of additional circuitry required.

SUMMARY

In accordance with one embodiment of the disclosure, the integrated interchip sound (I2S) audio bus standard defines different signals, such as a Word Clock (WCLK) that is a 48 kHz timing signal. A selected signal that is defined by the I2S standard, such as the WCLK, is processed and reduced in frequency, such as a factor of four resulting in a 48 kHz WCLK signal becoming a 12 kHz square wave. The reduced frequency signal is then converted from a square wave to a sine wave and placed onto the I2S bus when audio signals are not present. The detection of the reduced frequency signal verifies the functionality of the voice path and meets the requirements of many standards of monitoring the audio paths. In other implementations, a different signal other than the WCLK that is present in an apparatus may be employed.

In other implementations, a second I2S audio path may carry the reduced frequency signal. As the I2S bus is defined to have two channels that travel the same physical path, audio may be carried on one of the channels and the reduced frequency signal on the other channel. If the reduced frequency signal is not detected, a problem or fault exists on the I2S audio bus and both channels are impacted.

The above described features and advantages, as well as others, will become more readily apparent to those of ordinary skill in the art by reference to the following detailed description and accompanying drawings. While it is desirable to provide audio path monitoring or other advantageous features to alarm systems and other building automation systems, the teachings disclosed herein extend to those embodiments which fall within the scope of the appended claims, regardless of whether they accomplish one or more of the above-mentioned advantages.

DESCRIPTION

An example approach for monitoring an integrated interchip sound (I2S) audio bus is presented. In the example, a clock signal used by the audio bus (I2S audio bus in the current example) is processed to act as an audio signal and carried by the I2S bus. The I2S bus is monitored and is considered fault free if the processed audio signal is successfully carried by the I2S bus.

Figure 1:
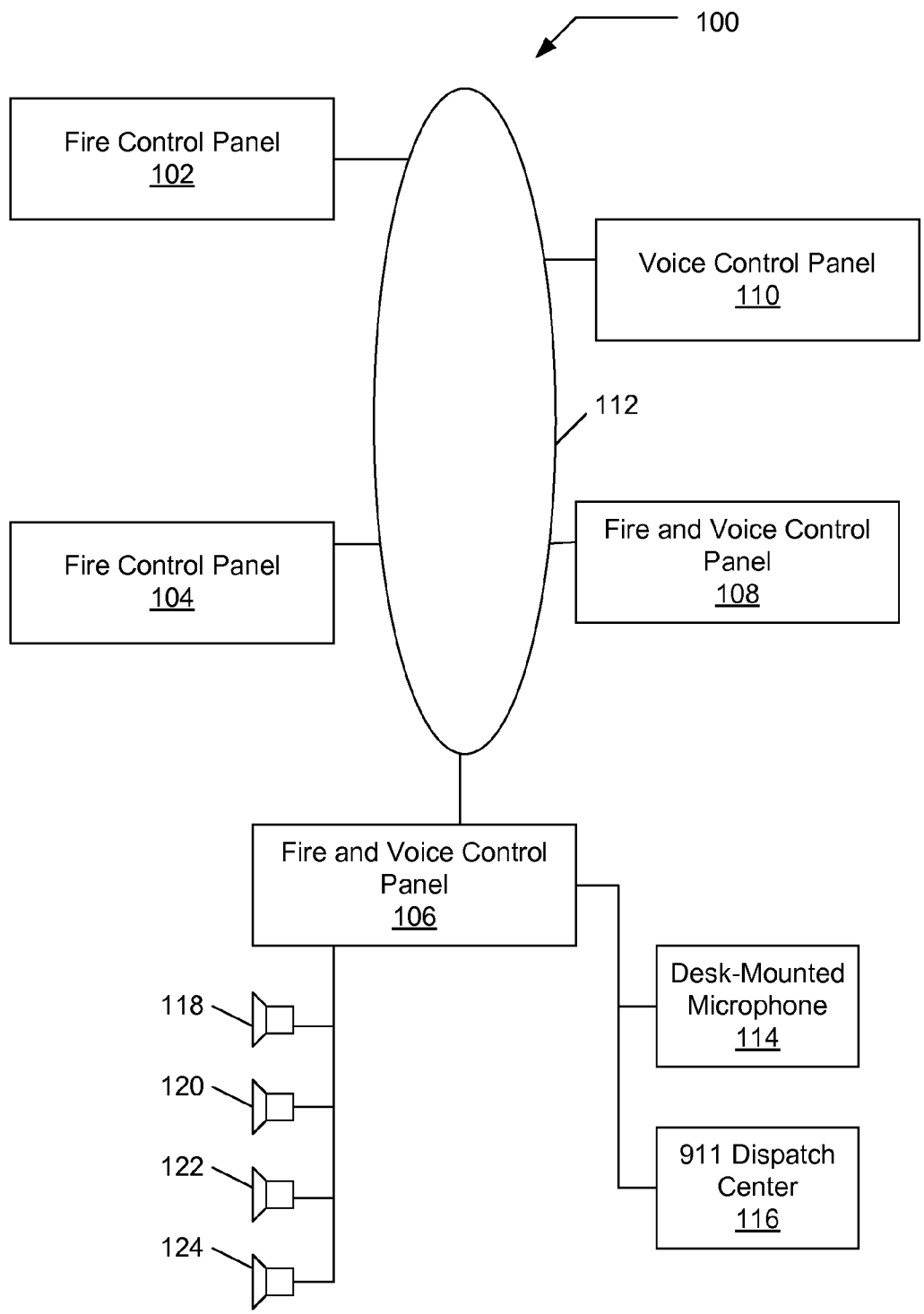
FIG. 1 is an exemplary topology diagram for a building fire alarm system.

With reference to FIG. 1, an exemplary topology diagram 100 for a building fire and audio alarm system approach is shown. The building fire and audio alarm system may have numerous fire control panels 102 and 104, fire and voice control panels 106 and 108, and voice control panels 110. In other implementations there may be more or fewer devices in the system. In yet other implementations, additional panels such as security panels or HVAC control panels may be present. The panels 102-110 may be networked together by a data network 112. The data network may have a physical layer of wire, radio waves, fiber optic cables, coaxial cable, or a combination of any of the above. Over the physical layer, additional protocol layers may be implemented to carry data, such as a TCP/IP network (commonly called the internet). The data network 112 may be configured as a local area network (LAN) that connects only the panels and building automation systems.

The fire and voice control panel, such as fire and voice control panel 106, may have associated desk mounted microphones 116 and connections to emergency centers, such as a 911 dispatch center 116. Additionally, the fire and voice control panel may have audio outputs for connection to speakers, such as speakers 118-124 and 120 or amplifiers (not shown). In other implementations, the desk microphone may be an internal microphone or other audio input device.

Figure 2:
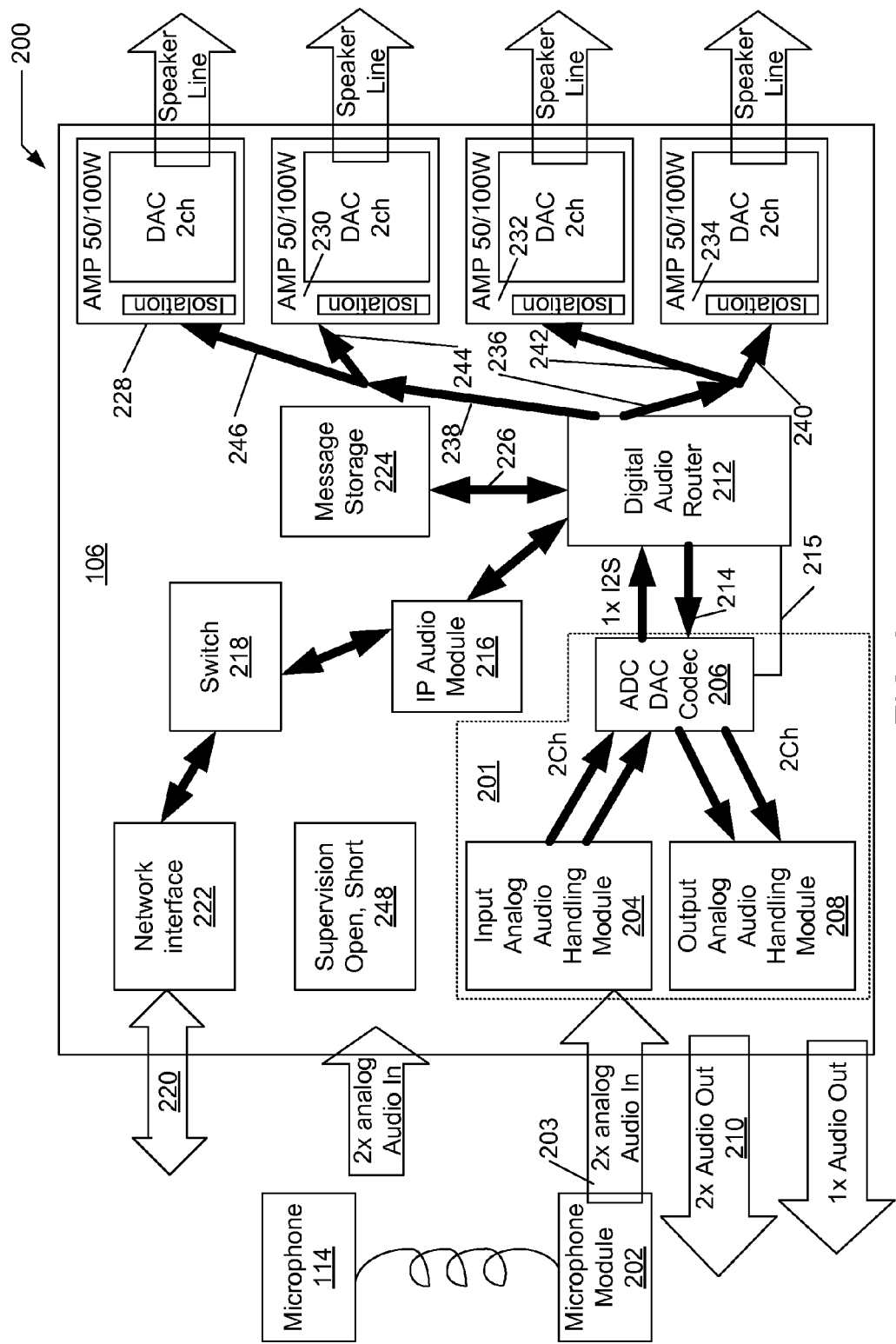
FIG. 2 is a block diagram of the fire and voice control panel of FIG. 1 depicted in accordance with an example implementation of the invention.

Turning to FIG. 2, a block diagram 200 of the fire and voice control panel 106 is depicted in accordance with an example implementation of the invention. The desk mounted microphone 114 may be connected to a microphone module 202 that supports one or more audio inputs 203 (two in the current example). The microphone module 202 is in signal communication with an input analog audio handling module 204. The input analog audio handling module 204 may provide separate channels to an ADC DAC codec 206 that is able to handle two audio channel inputs. The ADC DAC codec 206 may have a 48 kHz sampling rate with at least a 16 bit resolution. The analog to digital converter (ADC) and digital to analog converter (DAC) in the ADC DAC codec 206 may be implemented as slave devices. The analog channels may then be routed to the output analog audio handling module 208 for transmission on one of the analog outputs 210. The input analog audio handling module 204, output analog audio handling module 208, and ADC DAC codec 206 may be referred to jointly as an audio interface 201.

The ADC DAC codec 206 also communicates with digital audio router 212 that may be implemented with a field-programmable gate array (FPGA) via a two-way I2S audio bus 214.

An I2S audio bus (also called I²S, Inter-IC Sound, Integrated Interchip Sound, or IIS), such as I2S audio bus 214, is an electrical serial bus interface that consists of three lines, 1) a bit clock line, 2) a word clock line, and 3) at least one multiplexed data line. It may also include a master clock and a multiplexed data line for upload. Typically the I2S bus carries PCM digital audio data or signals. The I2S allows two channels to be sent on the same data line. The two channels are commonly called right (R) channel and left (L) channel. The word clock is typically a 50% duty-cycle signal that has the same frequency as the sample frequency. The I2S audio bus is defined by the Philips Semiconductor I2S bus specification (February 1986, revised Jun. 5, 1996).

The digital audio router 212 enables digitized audio, such as digitized analog audio from microphone 114, to be provided to an IP audio module 216. The IP audio module 216 converts the digitized audio into voice over IP (VOIP) encoded data. The IP audio module 216 may be one produced by BARIX. The output of the IP audio module 216 is VOIP encoded data. The VOIP encoded data is made available to a switch 218 that enables the VOIP encoded data to be transported by an IP network (Ethernet 220) by network interface 222.

The digital audio router 212 may also be connected to memory 224 via a data bus 226, where pre-recorded digitized audio messages may be stored in memory 224. The memory may also store metrics and operational data for the Fire and Voice Control Panel's operation. The memory 224 may be implemented as an electronic non-volatile computer storage device that can be electrically erased and reprogrammed, i.e., flash memory. In other implementations, other types of memory such as RAM, DRAM, SDRAM, and EEPROM may be employed.

One or more amplifiers and/or speakers may be in signal communication with the digital audio router 212, such as amplifiers 228-234 via I2S buses 236 and 238 (two I2S buses are used in the current example). Each of the buses 236 and 238 each have a respective L and R channels, i.e. 240, 242 and 244, 246. The output of each of the amplifiers 228-238 may be connected to speakers 118-124 of FIG. 1 respectively. A supervisory module 248 shown in FIG. 2 may monitor the operation of analog inputs from the microphone 114. As further explained herein, components of the digital audio router 212 and the ADC DAC codec 206 collectively define an apparatus and perform a process for supervising the I2S audio bus 214 in the fire and voice control panel 106 in accordance with the present invention. In one embodiment, an audio active control line 215 may be used to pass an audio active control output signal generated in the digital audio router 212 and sent to the ADC DAC codec 206 to indicate if audio is present at an analog or digital audio input. The digital audio router 212 may generate the audio active control output signal on line 215 in response to depression of a talk button (not shown in the figures) for enabling audio to be received by the audio interface 201 via the microphone 114. In this embodiment, the depression of the talk button is communicated to the digital audio router 212. When the signal is present on the active control line 215, the ADC DAC codec 206 disables the generation of a supervision signal 304 (shown in FIG. 3) on the I2S audio bus 214 channel or path to enable the audio present at the respective analog or digital audio input to be sent via the I2S audio bus 214 without corrupting or degrading the audio input.

Figure 3:
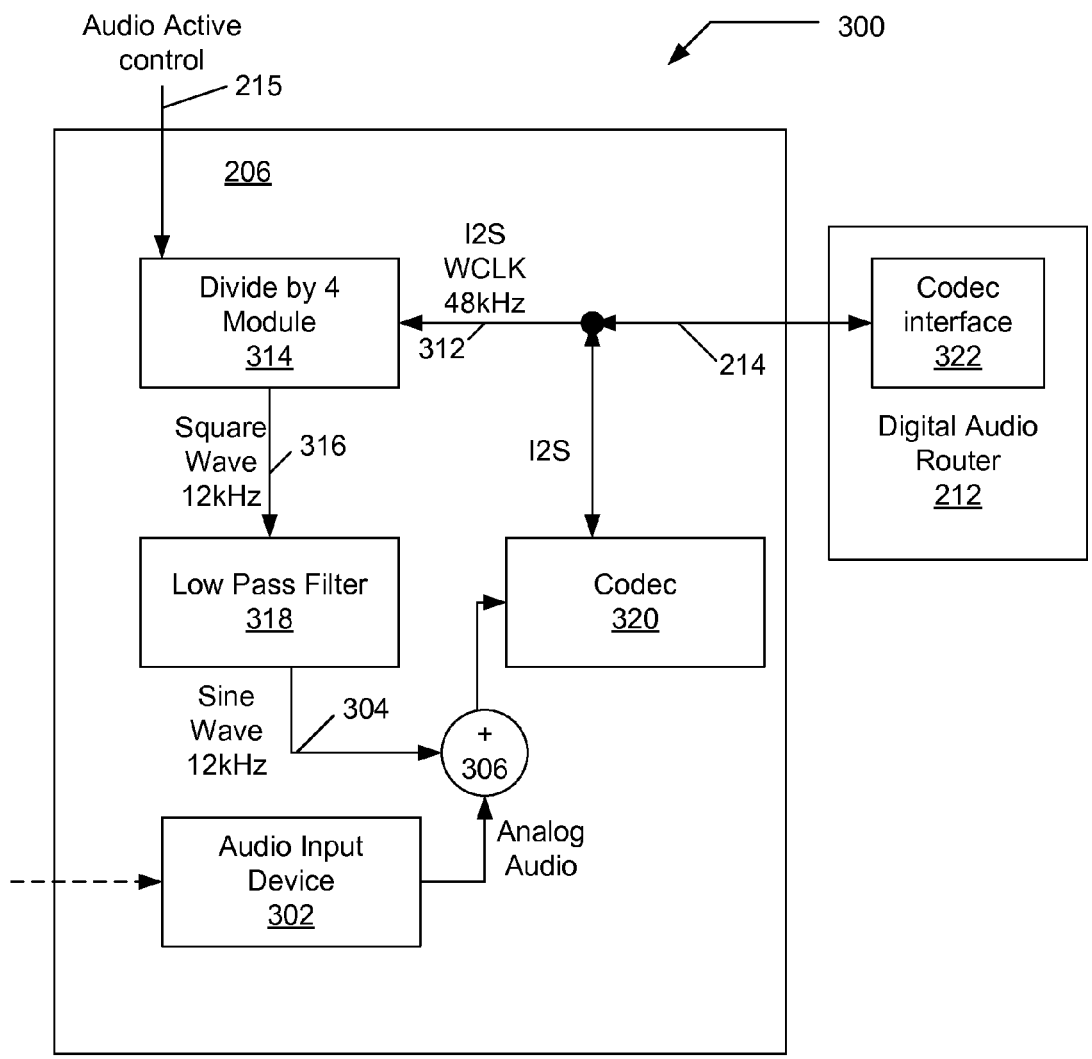
FIG. 3 shows an exemplary internal block diagram of the ADC DAC Codec of FIG. 2.

In FIG. 3 an exemplary internal block diagram 300 of the ADC DAC Codec 206 of FIG. 2 is depicted in association with components of the digital audio router 212 that may be collectively employed to perform the supervision of the I2S audio bus 214. An audio signal may be received from an analog audio handling module 204 (shown in FIG. 2) at an audio input 302 in the ADC DAC codec 206. In one embodiment, the ADC DAC codec 206 has a signal combiner 306 that is connected to the audio input 302 and a supervision signal 304 output of a supervision signal generator which in the embodiment shown in FIG. 3 includes a divider 314 and low pass filter 318. The signal combiner 306 is configured to combine the analog audio from the audio input 302 with the supervision signal 304. However, as further explained below, the audio active control signal 215 causes the divider 314 of the supervision signal generator to inhibit the output of the supervision signal 304 when an analog audio is present on the audio input 302. Accordingly, the resulting signal output from the combiner 306 is either the supervision signal 304 or the analog audio from the audio input 302. The resulting signal output from the combiner 306 is provided to the codec 320 which communicates with and transmits the digitized resulting signal to the codec interface 322 located with the digital router 212 via the I2S audio bus 214. In other embodiments, a switch or relay may be used instead of the combiner 306 with the audio active control 215 connected to the activation input of the switch or relay to control when the supervision signal 304 or the analog audio from the audio input 302 is to be digitized by the codec 320 and transmitted via the I2S audio bus to the digital audio router 212.

Because the I2S audio bus 214 is present, a word clock (WCLK) is available for use by the supervision generator in the ADC DAC codec 206 to generate the supervision signal 304. In the current example, a 48 kHz square wave WCLK 312 is used by the I2S audio bus. The WCLK 312 is divided by a divide by four module 314 resulting in a 12 kHz square wave 316. In other implementations, the divide by four module 314 may be implemented by a digital counter rather than a divider.

The divide by four module 314 may be activated and deactivated by the audio active control signal 215. An audio active control line is depicted in FIGS. 2 and 3, but in practice there may be an audio active control line associated with each channel of the I2S bus. In FIG. 3, the active control line is shown as controlling the divide by 4 module 314, which acts to turn on and off the generation the supervision signal 304 that is used to verify the integrity of the I2S path. In other implementations, the audio active control may control the combiner 306.

A low pass filter 318 further processes the 12 kHz square wave 316 and results in a 12 kHz sine wave that functions as the supervision signal 304 in accordance with the present invention. The resulting signal is passed to the digital audio router 212 and may be detected by the supervision module (not shown), which may be implemented internal to the audio router 212 and controls the audio active control signal. In other implementations, other values may be used for the WCLK 312 and divider 314 as long as the resulting sine wave is in the typical audio frequency band. The advantage of this approach for supervising the integrity of the I2S audio bus is no additional circuitry is required to generate an initial clock signal reducing the power consumption and complexity of the ADC DAC codec. In operation, the sine wave supervision signal 304 is switched into the audio path of the I2S audio bus when no audio is present as will be explained below. In other implementations, a different signal from the WCLK 312 may be selected that is reduced to a supervision signal for which the ADC DAC codec may process for transmission on the I2S audio bus 214.

Figure 4:
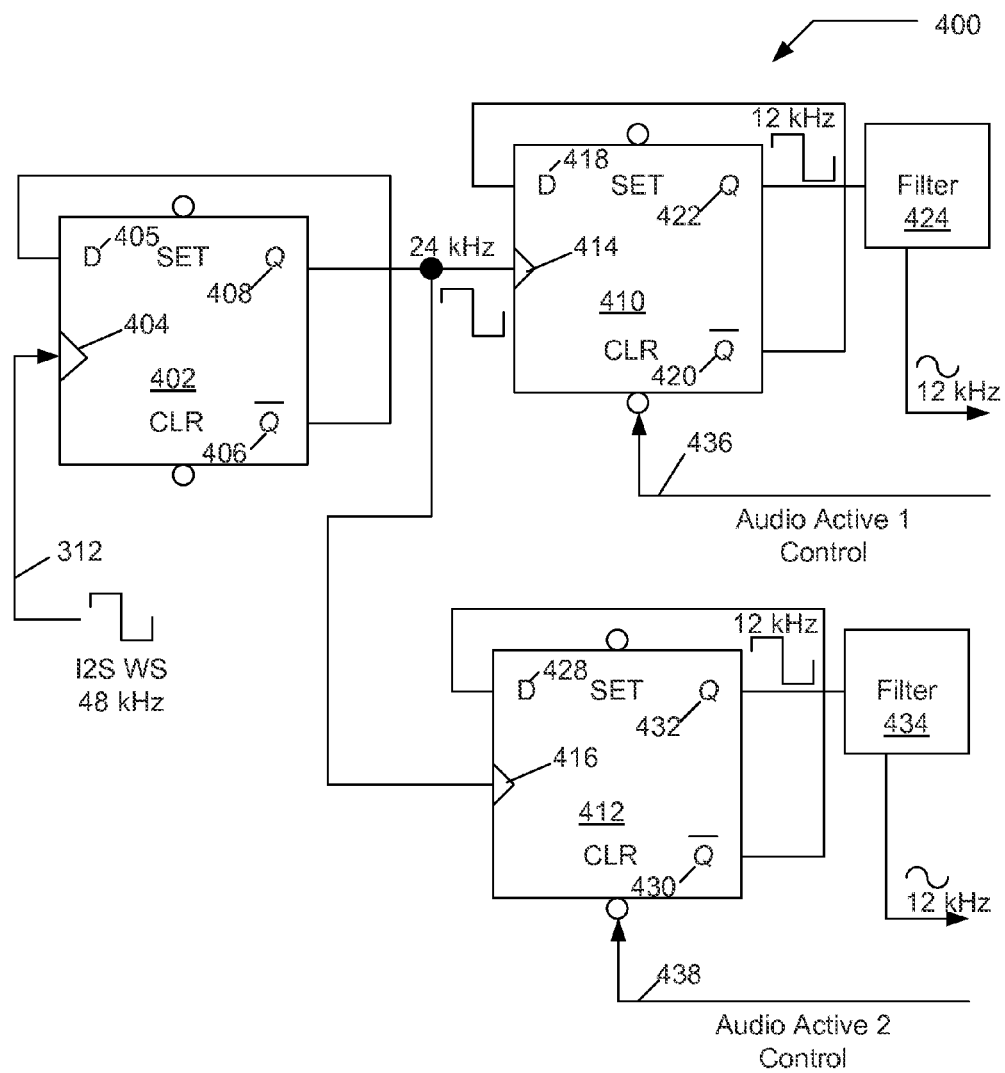
FIG. 4 shows an example circuit diagram of the divider and low pass filter of FIG. 3.

Turning to FIG. 4, a circuit diagram 400 of divider 314 and low pass filter 318 of FIG. 3 is depicted. The 48 kHz WCLK signal 312 is received at a clocked D Flip-Flop 402 clock input 404. The D input 405 is connected to the inverse Q output 406. The Q output 408 is a 24 kHz square wave that is coupled to the clock input 414 and 416 of the clocked D flip-flops 410 and 412 respectively. The D input 418 of clocked D flip-flop 410 is coupled to the inverse Q output 420. The Q output 422 is a 12 kHz square wave that is passed to the filter 424 that is a low pass filter. The filter converts the 12 kHz square wave into a 12 kHz sine wave 304. The clocked D flip-flop 410 is activated by the audio active 1 control signal 436. Similarly, the D input 428 of clocked D flip-flop 412 is coupled to the inverse Q output 430. The Q output 432 is a 12 kHz square wave that is passed to the filter 434 that is a low pass filter. The clocked D flip-flop 412 is activated by the audio active 2 control signal 438 and essentially disables the divider 314 when the channel is being used for regular audio. In other implementations, other approaches for division of the 48 kHz frequency of the word clock of the I2S audio bus to a 12 kHz signal (or other frequency signal within the audio range, preferably smaller, such as microcontrollers, other logic devices, FPGAs, may be employed. Similarly, in other implementations the 48 kHz clock signal associated with the I2S audio bus may be reduced to any frequency that is supported by the ADC DAC for generating the supervision signal 304.

Figure 5:
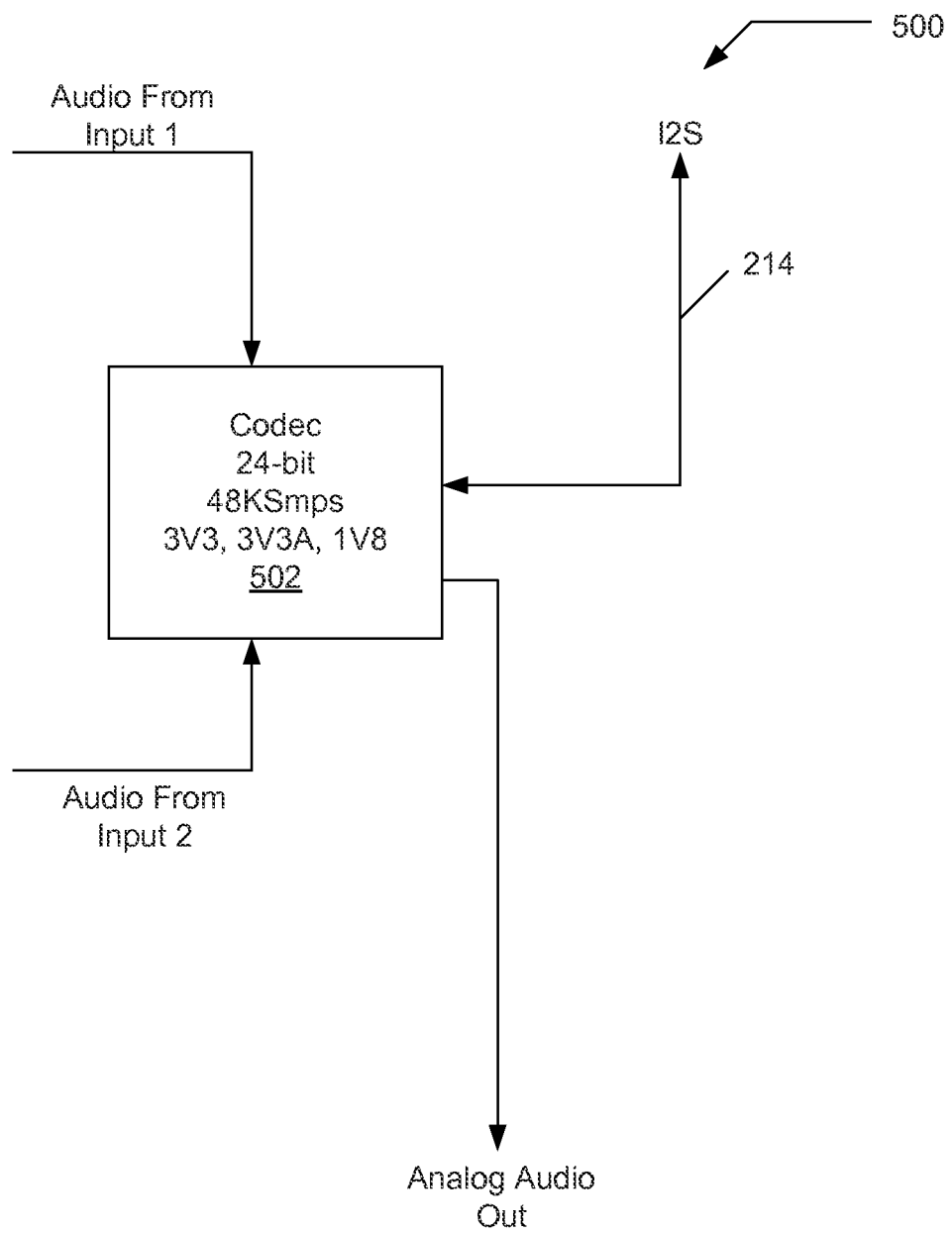
FIG. 5 shows an internal block diagram of ADC DAC codec.

In FIG. 5, an internal block diagram 500 of ADC DAC codec 206 is illustrated. A 24-bit codec 502 that accepts 48K samples of the audio inputs or accepts digital input via the bi-directional I2S bus 214 from the digital audio router 212 of FIG. 2 is depicted. In other implementations, a different resolution codec may be employed. Thus, the supervision signal 304 (12 kHz sine wave) enters the codec in the analog state. It is then converted to a digital signal and sent over the I2S bus to the digital audio router 212. The digital audio router 212 detects the digital signal and makes a determination as to whether or not it has the correct characteristics for the predetermined supervision signal 304. If the supervision signal is determined to be the 12 kHz sine wave, the codec and preamplifiers are properly working within the semiconductors and no faults are detected in the I2S audio bus 214 such that the integrity of the I2S audio bus 214 is confirmed.

Figure 6:
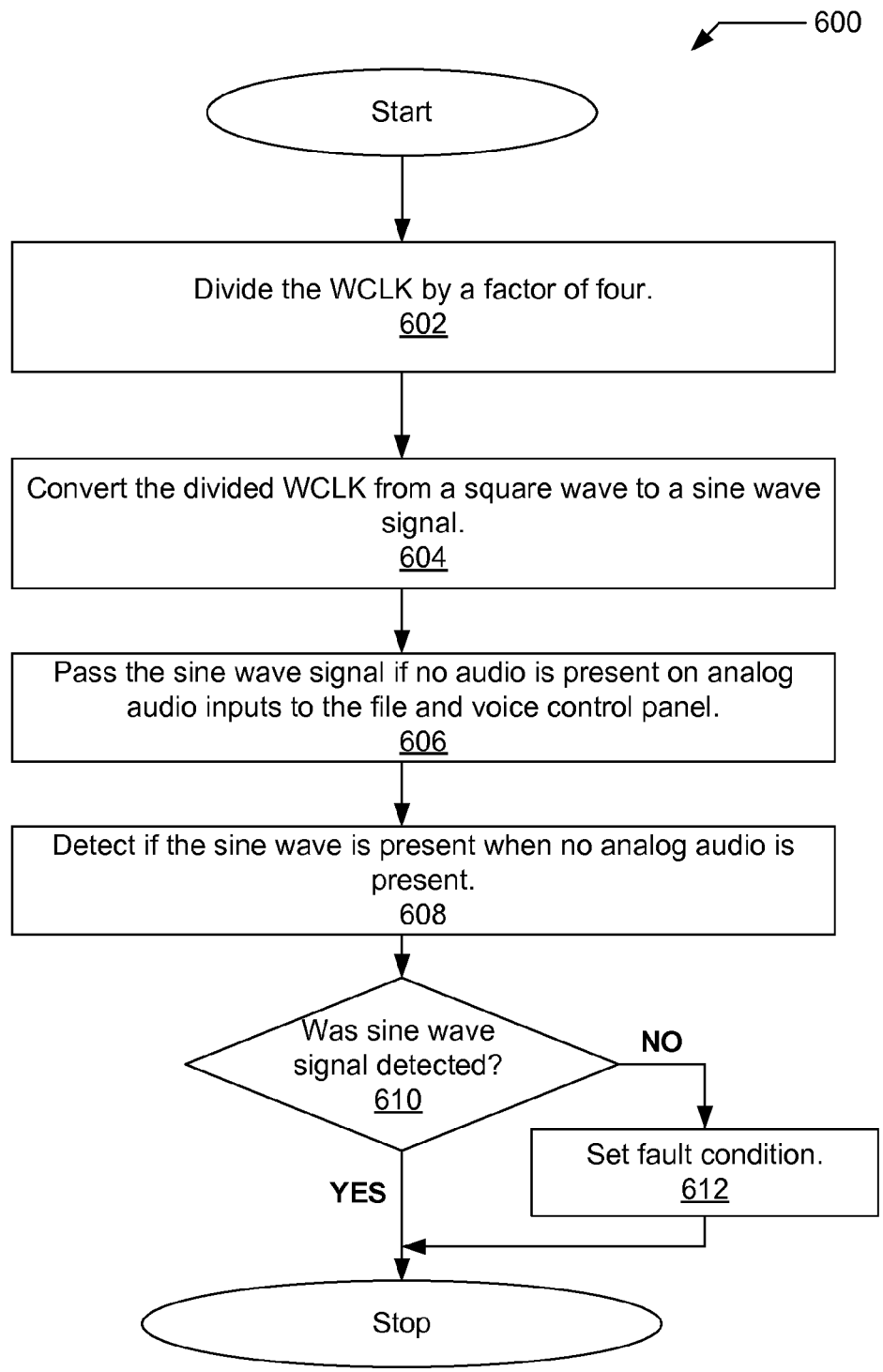
FIG. 6 shows a flow diagram 600 for an approach for supervision of I2S audio paths in accordance with an embodiment of the invention.

Turning to FIG. 6, a flow diagram 600 for an approach for supervision of I2S audio paths in accordance with an embodiment of the invention is illustrated. The I2S audio path's WCLK having a first frequency (e.g., 48 kHz square wave clock signal) is divided by four resulting in a second signal having a second frequency (e.g., 12 kHz square wave clock signal or other frequency, preferably smaller, but still within the audio range) in step 602. The second signal or 12 kHz square wave clock signal is passed through a low pass filter and converted to a sine wave in step 604. If no input audio signals are present, the sine wave signal is passed through the ADC DAC codec in step 606. The digital audio router 212 detects if the sine wave is present when no audio is present on the audio buses in step 608. If it is determined in decision step 610 that the sine wave signal is detected in step 608, then no fault exists in the I2S audio path and the process stops. Otherwise, if the sine wave signal is not detected in step 608, then a fault condition is set in step 612 and the process stops.

The foregoing detailed description of one or more embodiments of the supervision of I2S audio paths has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

The invention claimed is:

1. A method of supervision of an audio bus having a first channel and a second channel, comprising the steps of:
   receiving a first signal having a first frequency from the audio bus at a divider, wherein the first signal is a word clock signal having a square wave;
   reducing the first frequency of the first signal resulting in a second signal having a second frequency;
   transmitting the second signal having the second frequency over the first channel of the audio bus when the first channel is not in use; and
   verifying transmission of the second signal with the second frequency on the audio bus.

2. The method of claim 1, where the second signal is a sine wave that results from the square wave by a filter.

3. The method of claim 1, where the first channel is not in use and the second channel is an active channel.

4. The method of claim 1, where the first frequency is a 48 KHz frequency.

5. The method of claim 4, where the second frequency is a 12 kHz frequency.

6. The method of claim 1, where verifying transmission of the second signal further includes, indicates that a fault condition exists.

7. The method of claim 1, where the audio bus is an I2S audio bus.

8. An apparatus with an audio bus having a first channel and a second channel, comprising:
   a divider in receipt of a first signal having a first frequency from the audio bus, where the divider reduces the first frequency resulting in a second signal having a second frequency, wherein the first signal is a word clock signal having a square wave;
   a transmitter that transmits the second signal having the second frequency over the first channel of the audio bus when the first channel is not in use;
   a receiver in receipt of the second signal with the second frequency on the audio bus; and
   verifying transmission of the second signal with the second frequency on the audio bus.

9. The apparatus of claim 8, further comprising a filter that converts the square wave associated with the first signal into a sine wave associated with the second signal.

10. The apparatus of claim 8, where the first channel is not in use and the second channel is an active channel.

11. The apparatus of claim 8, where the first frequency is a 48 KHz frequency.

12. The apparatus of claim 11, where the second frequency is a 12 kHz frequency.

13. The apparatus of claim 8, where the receiver in receipt of the second signal further includes, a fault indication that is set if a fault condition is detected at the receiver.

14. An apparatus with an I2S bus having a first channel and a second channel, comprising:
- a divider in receipt of a first signal having a first frequency from the I2S bus, where the divider reduces the first frequency resulting in a second signal having a second frequency; wherein the first signal is a word clock signal having a square wave;
- a transmitter that transmits the second signal having the second frequency over the first channel of the I2S bus when the first channel is not in use; and
- a receiver that receives and verifies transmission of the second signal with the second frequency on the I2S bus.

15. The apparatus of claim 14, further comprising a filter that converts the square wave associated with the first signal into a sine wave associated with the second signal.

16. The apparatus of claim 14, where the first channel is not in use and the second channel is an active channel.

17. The apparatus of claim 14, where the first frequency is a 48 KHz frequency.

18. The apparatus of claim 17, where the second frequency is a 12 kHz frequency.

* * * * *

UNITED STATES PATENT AND TRADEMARK OFFICE
CERTIFICATE OF CORRECTION

PATENT NO. : 9,026,684 B2  Page 1 of 1
APPLICATION NO. : 14/041267
DATED : May 5, 2015
INVENTOR(S) : Leonid Ayzenshtat It is certified that error appears in the above-identified patent and that said Letters Patent is hereby corrected as shown below:

Title page, Item (54), and in the Specification column 1, line 1, Title, please delete "DIGIITAL" and insert --DIGITAL--.

Signed and Sealed this
Eighth Day of September, 2015

Michelle K. Lee
*Director of the United States Patent and Trademark Office*